US006679647B2

(12) United States Patent
Hixon (10) Patent No.: US 6,679,647 B2
(45) Date of Patent: Jan. 20, 2004

(54) QUICK-CONNECT FASTENER FOR ELECTRICAL FIXTURES (75) Inventor: Troy Hixon, Plainville, KS (US)

(73) Assignee: Palmer Hargrave, Inc.

( * ) Notice: Subject to any disclaimer, the term of this patent is extended or adjusted under 35 U.S.C. 154(b) by 0 days.

(21) Appl. No.: 10/055,439

(22) Filed: Jan. 23, 2002

(65) Prior Publication Data

US 2003/0138291 A1 Jul. 24, 2003

(51) Int. Cl.[7] ............................................... F16D 1/112
(52) U.S. Cl. ............................ 403/349; 403/DIG. 4; 362/365; 362/147; 439/314; 439/335
(58) Field of Search ............................. 403/348, 349, 403/DIG. 4; 411/551, 552, 553; 362/370, 226, 364, 365, 372, 145, 147; 439/700, 314, 334–336, 537; 174/65 R (56) References Cited

U.S. PATENT DOCUMENTS

| | | | | | |
|---|---|---|---|---|---|
| 2,972,676 | A | * | 2/1961 | Moser | .................. 174/64 X |
| 3,423,781 | A | * | 1/1969 | Henson | ................ 403/349 X |
| 3,742,208 | A | * | 6/1973 | Mills | |
| D256,231 | S | * | 8/1980 | Laudig | |
| 4,361,374 | A | * | 11/1982 | Marmillion et al. | ........ 439/314 |
| 4,464,001 | A | * | 8/1984 | Collins | |
| 4,489,991 | A | * | 12/1984 | Delam | .................... 384/428 |
| 4,646,214 | A | * | 2/1987 | Mendleski | |
| 4,906,147 | A | * | 3/1990 | Friesinger et al. | ...... 403/349 X |
| 5,094,464 | A | * | 3/1992 | Musacchia, Sr. | ........ 403/349 X |
| 5,154,628 | A | * | 10/1992 | Skegin | .................. 439/700 X |
| 5,513,622 | A | * | 5/1996 | Musacchia, Sr. | ........ 403/349 X |
| 5,713,765 | A | * | 2/1998 | Nugent | ................... 439/700 |
| 5,871,222 | A | * | 2/1999 | Webb | ................... 403/348 X |
| 6,126,359 | A | * | 10/2000 | Dittrich et al. | ............. 403/349 |
| D457,678 | S | * | 5/2002 | Yang | |
| 6,394,752 | B1 | * | 5/2002 | Lai | ........................ 403/349 X |

* cited by examiner

Primary Examiner—Lynne H. Browne
Assistant Examiner—Ryan M. Flandro
(74) Attorney, Agent, or Firm—Hovey Williams LLP (57) ABSTRACT An electrical fixture is mounted adjacent a stable surface via a standard J-box using a quick-connect fastener which allows the electrical fixture to be electrically coupled to wires extending through the J-box prior to physically coupling the electrical fixture to the J-box, while also minimizing twisting of the wires in the J-box during attachment of the electrical fixture to the J-box.

36 Claims, 4 Drawing Sheets

FIG. 7 dfdf # QUICK-CONNECT FASTENER FOR ELECTRICAL FIXTURES

BACKGROUND OF THE INVENTION

1. Field of the Invention

The present invention relates generally to electrical fixtures and fasteners for attaching such fixtures to stable structures. In another aspect, the invention relates to a quick-connect system for coupling a light fixture, such as a sconce, to a standard electrical J-box.

2. Description of the Prior Art

Figure 1:
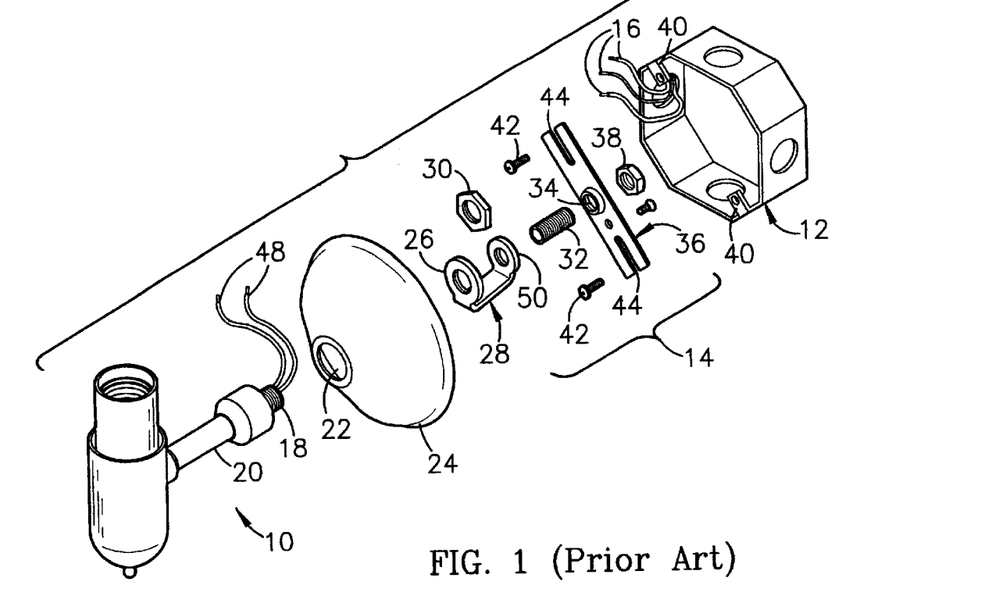
FIG. 1 is an isometric assembly view of a conventional sconce, J-box, and attachment means, wherein the sconce includes a back plate which does not slide along the length of the arm, thereby requiring the sconce to be electrically wired to the J-box prior to being physically coupled to the J-box.

Conventional light fixtures supported on vertical walls (e.g., sconces) are typically attached to the walls via standard J-boxes. FIG. 1 shows a conventional sconce 10, J-box 12, and attachment means 14. The J-box 12 is typically rigidly coupled to wall studs during electrical wiring of the structure. Electrical source wires 16 extend through an opening in a side wall of the J-box 12. To attach the sconce 10 to the J-box 12, a threaded tip 18 of an arm 20 of the sconce 10 is extended through an opening 22 in a back plate 24 and threaded into a first end 26 of a hickey 28. The arm 20 is then secured to the first end 26 of the hickey 28 by threading a hex nut 30 onto the threaded tip 18 and tightening the nut 30 against the inside surface of the first end 26 of the hickey 28. A threaded nipple 32 can then be threaded into a threaded opening 34 in a back strap 36 and fixed relative to the back strap 36 via a hex nut 38. The back strap 36 can then be coupled to a pair of protruding tabs 40 of the J-box 12 by extending a pair of screws 42 through a pair of slots 44 in the back strap 36 and into corresponding threaded holes in the tabs 40. Once the hickey 28 is fixed to the arm 20 and the threaded nipple 32 is fixed to the J-box 12 (via the back strap 36), electrical supply wires 48 of the sconce 10 can be electrically coupled to the electrical source wires 16 of the J-box 12. The sconce 10 can then be physically coupled to the J-box 12 by screwing a second end 50 of the hickey 28 onto a portion of the threaded nipple 32 which extends outwardly from the back strap 36.

A significant disadvantage of the conventional system illustrated in FIG. 1 is that the entire sconce 10 must be rotated relative to the J-box 12 in order for the hickey 28 to be threaded onto the nipple 32. Such a configuration causes the electrical wires 16,48 to become twisted within the J-box 12 during physical attachment of the sconce 10 to the J-box 12. Obvious problems (e.g., electrical shorts and fire hazards) are associated with excessive twisting of the electrical wires 16,48 in the J-box 12.

Figure 2:
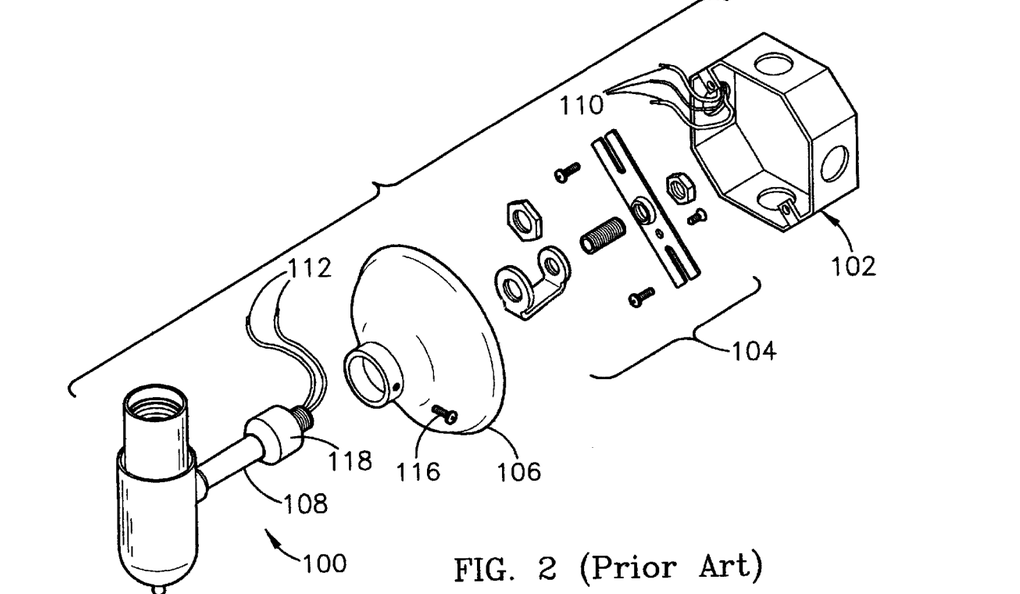
FIG. 2 is an isometric assembly view of a convention sconce, J-box, and sconce attachment means, wherein the sconce includes a back plate which slides along the length of the sconce's arm to allow the sconce to be electrically wired to the J-box after the sconce has been physically coupled to the J-box.

FIG. 2 shows a conventional sconce 100, J-box 102, and attachment means 104 similar to those shown in FIG. 1, however, the sconce 110 in FIG. 2 has a back plate 106 which is slidable on the arm 108 of the sconce 100. This configuration avoids the problem of the electrical wires 110,112 twisting in the J-box 102 because the electrical supply wires 112 of the sconce 100 can be connected to the electrical source wires 110 of the J-box 102 after the sconce 100 is fixed to the J-box 102. Access to the wires 110,112 after the sconce 100 is mounted on the J-box 102 is provided by sliding the back plate 106 on the arm 108 away from the J-box 102. Once the wires 110,112 are electrically coupled to one another, the back plate 106 can be slid towards the J-box 102 and fixed to the arm 108 by tightening a set screw 116 in the back plate 114 against an outer surface 118 the arm 108.

A significant disadvantage of the conventional system illustrated in FIG. 2 is that such a system requires the length of the arm 108 to be sufficient for allowing the back plate 106 to be slid far enough away from the J-box 102 so that the electrical wires 110,112 can be accessed for manual connection to one another. The required minimum length of the sconce arm 108 can be especially disadvantageous in view of building safety restrictions which limit the distance that an object may project from a wall surface. For example, in order to comply with the American's with Disabilities Act (ADA), sconces positioned less than 80 inches above the floor must protrude no more than 4 inches from the wall. This limitation on the length of the sconce arm 108 makes it virtually impossible to slide the back plate 106 far enough away from the J-box 102 to provide access for connecting the electrical wires 112 of the sconce 100 to the electrical wires 110 in the J-box 102.

OBJECTS AND SUMMARY OF THE INVENTION

It is therefore an object of the present invention to provide a system for coupling an electrical fixture to a standard J-box without causing substantial twisting of the electrical wires in the J-box.

A further object of the present invention is to provide a system for mounting a sconce having a short protruding arm adjacent a wall via a standard J-box without causing substantial twisting of the electrical wires in the J-box.

Accordingly, in one embodiment of the present invention there is provided a connector for releasably coupling an electrical fixture to a J-box. The connector generally comprises a female member and a male member. The female member has an inner surface which defines an internal bore. The female member includes at least one connection slot extending into the inner surface. The slot comprises a generally axially extending terminal recess. The male member presents an outer surface which defines a protrusion. The male member includes at least one coupling element extending outwardly from the outer surface. The male and female members are shiftable between a decoupled position wherein the male and female members are separated from one another and a coupled position wherein the protrusion is at least partly received in the internal bore and the coupling element is at least partly received in the terminal recess, thereby inhibiting rotation of the male and female members relative to one another.

In accordance with another embodiment of the present invention there is provided an electrical fixture mountable adjacent a generally flat surface via a standard J-box. The fixture generally comprises an arm assembly and a quick-connect fastener. The arm assembly is adapted to extend outwardly from the surface when the fixture is mounted adjacent the surface. The quick-connect fastener is adapted to releasably couple the arm assembly to the J-box. The quick-connect fastener generally includes a female member, a male member, and a biasing mechanism. The female member has an inner surface which defines an internal bore. The female member includes a connection slot extending into the inner surface and including a generally axially extending terminal recess. The male member presents an outer surface which defines a protrusion. The male member includes a coupling element extending outwardly from outer the surface. One of the male or female members is coupled to the arm assembly and the other of the male or female members is adapted to be coupled to the J-box. The quick-connect fastener is shiftable between a decoupled position wherein the male and female members are separated and a coupled position wherein the protrusion is at least partly received in the internal bore and the coupling element is held in the terminal recess by the biasing mechanism, thereby inhibiting rotation of the male and female members relative to one another.

In accordance with a further embodiment of the present invention there is provided a sconce mountable on a wall via a conventional J-box. The sconce generally comprises a light bulb socket, an elongated arm, an electrically conductive wire, a back strap, and a quick-connect fastener. The socket is adapted to receive a light bulb. The elongated arm has a distal end coupled to the socket and a proximal end. The arm defines an internal channel extending between the proximal and distal ends. The electrically conductive wire is electrically coupled to the light bulb socket, extends through the internal channel, and projects out of the proximal end of the arm. The back strap is adapted to be coupled to the J-box. The quick-connect fastener generally comprises a male member coupled to the proximal end of the arm, a female member coupled to the back strap, and a biasing mechanism. The female member has an inner surface which defines and internal bore. The female member includes a connection slot extending into the inner surface. The connection slot comprises a generally axially extending portion, a generally circumferentially extending portion, and a generally axially extending terminal recess. The male member presents an outer surface which defines a protrusion. The male member includes a coupling element extending outwardly from the outer surface. The male and female members are shiftable between a decoupled position wherein the male and female members are separated and a coupled position wherein the protrusion is at least partly received in the internal bore and the coupling element is held in the terminal recess by the biasing mechanism, thereby inhibiting rotation of the male and female members relative to one another.

In accordance with a still further embodiment of the present invention there is provided a method of mounting an electrical fixture adjacent a surface via a standard J-box, the method comprises the steps of: (a) coupling one of either a male member or a female member to a back strap; (b) coupling the other of the male or female members to the fixture; (c) inserting a protrusion of the male member into an internal bore of the female member; and (d) rotating the fixture relative to the J-box through an angle of less than 360°, thereby securely coupling the fixture to the J-box.

It should be noted that the above-listed objects need not be accomplished by the present invention and further objects and advantages of the present invention will be apparent from the detailed description of the preferred embodiments, the drawings, and the claims.

DETAILED DESCRIPTION OF THE PREFERRED EMBODIMENTS

Figure 3:
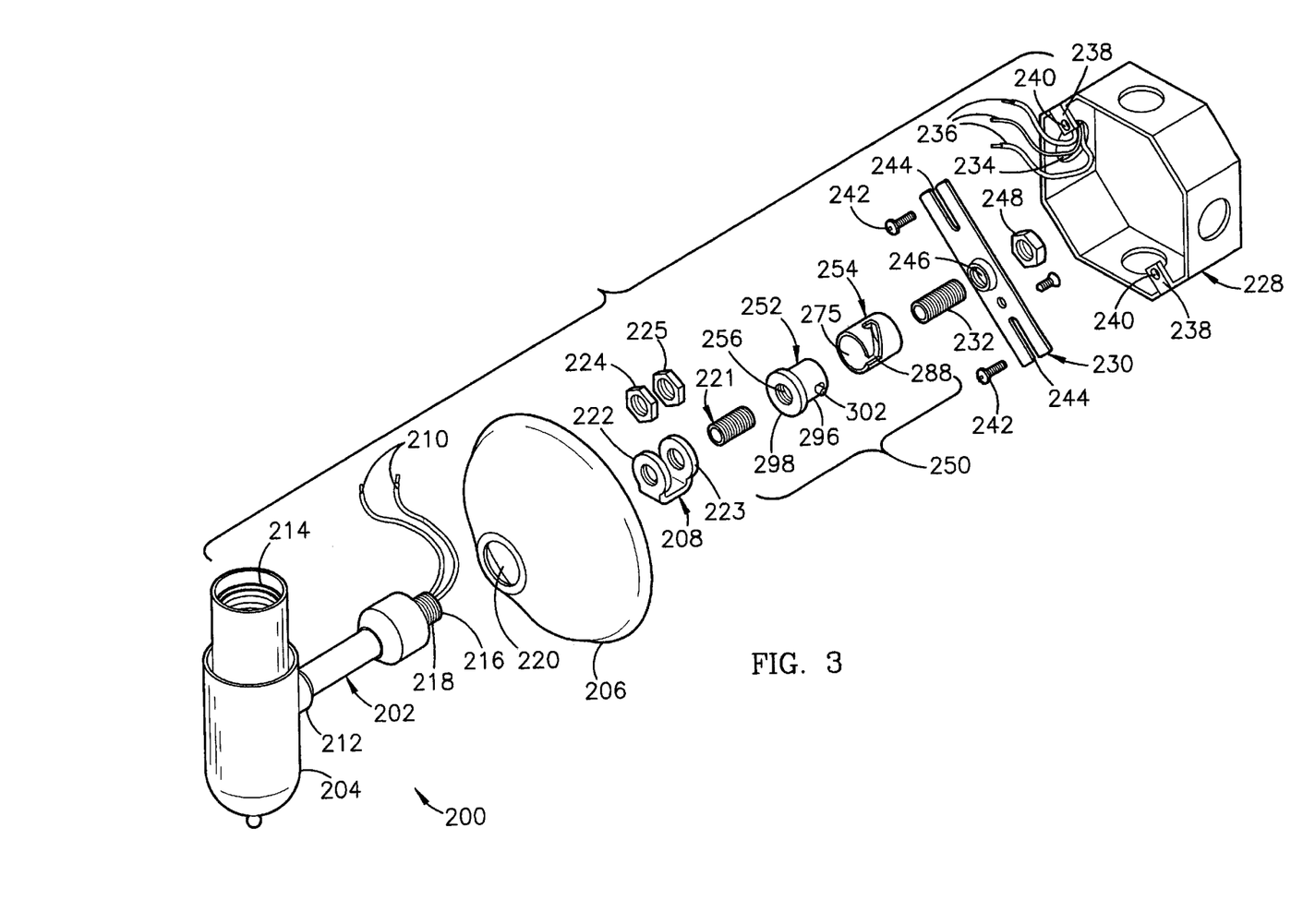
FIG. 3 is an isometric assembly view of a sconce, J-box, and sconce attachment means constructed in accordance with the principles of the present invention, wherein the sconce attachment means includes a quick-connect fastener for physically coupling the sconce to the J-box.

Referring initially to FIG. 3, a sconce 200 is illustrated as generally comprising an elongated arm 202, an end piece 204, a back plate 206, a hickey 208, and a pair of electrically conductive supply wires 210. End piece 204 is coupled to a distal end 212 of arm 202 and includes a light bulb socket 214 for receiving, holding, and providing an electrical connection to a standard electrical light bulb (not shown). Arm 202 has a generally tubular structure and defines an internal channel extending from distal end 212 to a proximal end 216 of arm 202. Wires 210 are electrically coupled to socket 214 and provide power to a standard light bulb via socket 214. Wires 210 are preferably hidden within and run through internal channels in end piece 204 and arm 202 and extend out of arm 202 at proximal end 216. Proximal end 216 preferably includes a male threaded portion 218. When sconce 200 is assembled, wires 210 and distal end 212 of arm 202 extend through an opening 220 in back plate 206 so that back plate 206 is received on arm 202. A first end 222 of hickey 208 can be screwed on the male threaded portion 218 of arm 202 to hold back plate 206 on arm 202. When male threaded portion 218 is extended at least partly through first end 222 of hickey 208, a hex nut 224 can be screwed onto the tip of threaded portion 218 and tightened against the inner surface of first end 222 of hickey 208 to thereby securely fasten hickey 208 and arm 202 to one another. A threaded nipple 221 can then be screwed into a second end 223 of hickey 208 and coupled thereto by a hex nut 225. In an alternative embodiment, back plate 206 can be integrally formed with or rigidly coupled to arm 202 near proximal end 216.

FIG. 3 further illustrates a J-box 228, a back strap 230, and a threaded nipple 232. As used herein, the term "J-box" denotes any electrical component used in the wiring of commercial and/or residential buildings which can be rigidly attached to a relatively stable structure (e.g., a wall or ceiling), is adapted to physically support an electrical fixture (e.g., a sconce, ceiling fan, chandelier, etc.), and is adapted to allow for electrical source wires running through the structure to be electrically connected to electrical supply wires of the electrical fixture. J-box 228, illustrated in FIG. 3, is preferably rigidly mounted on a wall stud (not shown)

and includes an opening 234 for allowing electrical source wires 236 to extend into the interior space of J-box 228. J-box 228 includes a pair of tabs 238, each having a threaded hole 240 therein. Back strap 230 can be coupled to J-box 228 by extending screws 242 through slots 244 on opposite ends of back strap 230 and into corresponding threaded holes 240. Prior to coupling back strap 230 to J-box 228, threaded nipple 232 is screwed into a threaded opening 246 in back strap 230 until at least a portion of threaded nipple 232 extends completely through back strap 230. A hex nut 248 can then be screwed onto the portion of nipple 232 extending through back strap 230 and tightened against the surface of back strap 230 to restrain relative rotation of nipple 232 and back strap 230.

Figure 7:
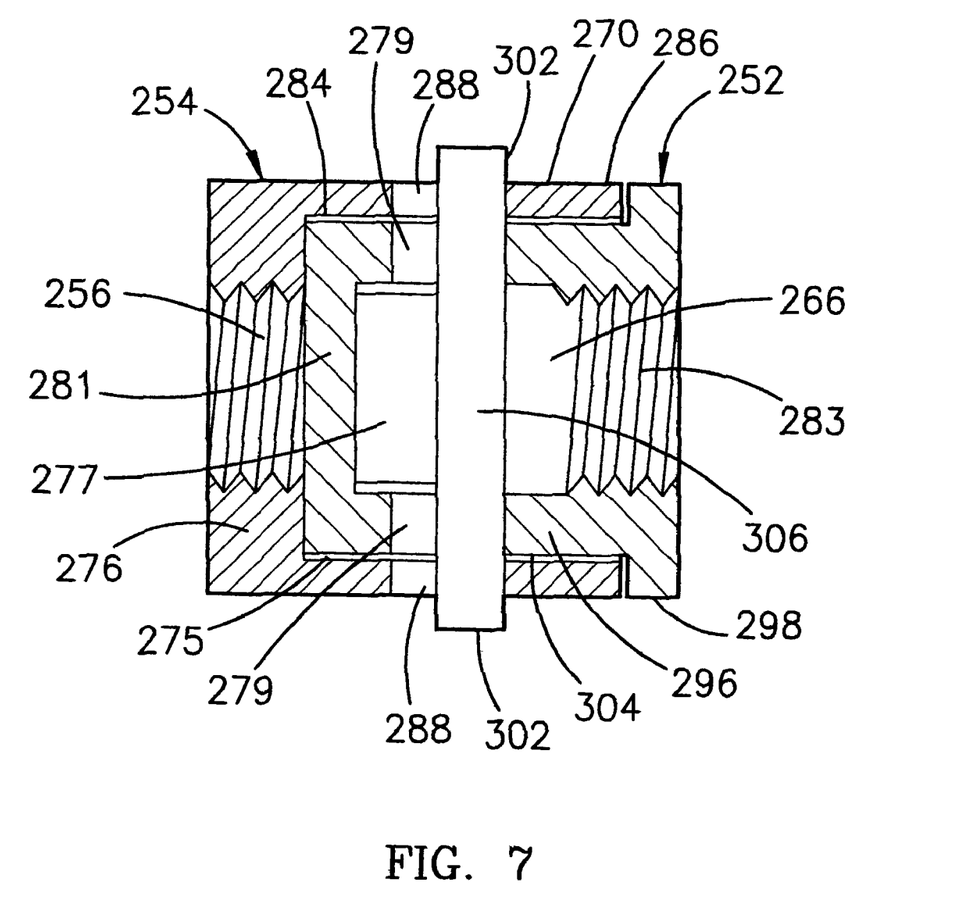
FIG. 7 is a sectional side view of the quick-connect fastener with the male and female members being coupled together.

Once threaded nipple 221 is fastened to arm 202 (via hickey 208) and threaded nipple 232 is fastened to J-box 228 (via backstrap 230), a quick-connect fastener 250 can be used to couple sconce 200 to J-box 228. Quick-connect fastener 250 generally includes a male member 252 and a female member 254. Prior to coupling sconce 200 to J-box 228, male member 252 can be connected to threaded nipple 221 and female member 254 can be connected to threaded nipple 232. Male member 252 can be attached to threaded nipple 221 by screwing threaded nipple 221 into an axially extending threaded opening 256 (best shown in FIGS. 4 and 7) of male member 252. Female member 254 can be attached to threaded nipple 232 by screwing threaded nipple 232 into an axially extending threaded opening 256 (best shown in FIGS. 5 and 7) of female member 254.

Figure 4A:
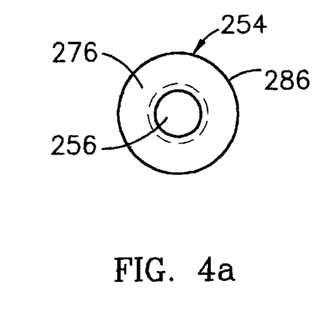
FIG. 4a is a left end view of a female member of the quick-connect fastener.
Figure 4B:
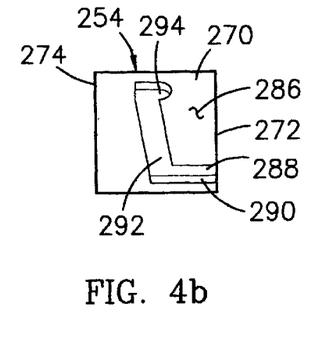
FIG. 4b is a side view of the female member of the quick-connect fastener.
Figure 4C:
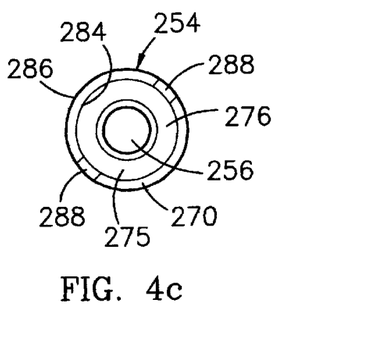
FIG. 4c is a right end view of the female member of the quick-connect fastener.

Referring now to FIG. 4, female member 254 generally includes an annular cylindrical side wall 270 presenting an open end 272 and a closed end 274. Closed end 274 includes a generally circular end wall 276 which defines centrally located threaded opening 256. Side wall 270 presents generally cylindrical inner and outer surfaces 284, 286. Inner surface 284 defines a generally cylindrical axially extending internal bore 275 which extends inwardly into female member 254 from open end 272. A pair of elongated slots 288 are preferably formed in side wall 270 and each extend completely through side wall 270 from inner surface 284 to outer surface 286. It is, however, within the ambit of the present invention for slots 288 to extend from inner surface 284 only partly into side wall 270 and not completely to outer surface 286. Slots 288 are preferably open at open end 272 of side wall 270. Each slot 288 preferably includes a generally axially extended portion 290, a generally circumferentially extending portion 292, and a generally axially extending terminal recess 294. Generally axially extending portion 290 extends relative to the longitudinal axis of female member 254 at an angle of less than about 45°, more preferably less than about 30°, and still more preferably less than about 15°. Most preferably, generally axially extending portion 290 extends at least substantially parallel to the longitudinal axis of female member 254 from open end 272 to generally circumferentially extending portion 292. Generally circumferentially extending portion 290 extends relative to the longitudinal axis of female member 254 at an angle in the range from about 45° to about 135°, more preferably from about 60° to about 120°, and still more preferably from 75° to 105°. Most preferably, generally circumferentially extending portion 292 extends between generally axially extending portion 290 and terminal recess 294 along the circumference of side wall 270 in a direction which is slightly skewed from perpendicular to the longitudinal axis of female member 254. Terminal recess 294 extends at least substantially parallel to the longitudinal axis of female member 254 from generally circumferentially extending portion 292 towards open end 272 of side wall 270.

Figure 5A:
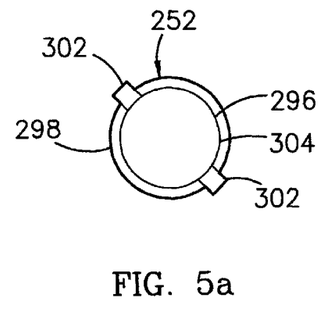
FIG. 5a is a left end view of a male member of the quick-connect fastener.
Figure 5B:
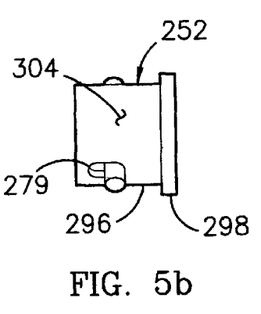
FIG. 5b is a side view of the male member of the quick-connect fastener.
Figure 5C:
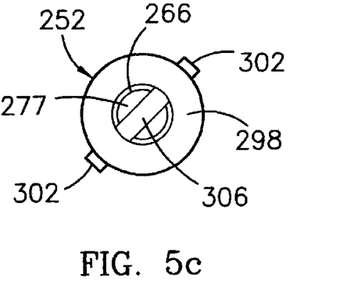
FIG. 5c is a right end view of the male member of the quick-connect fastener.
Figure 6:
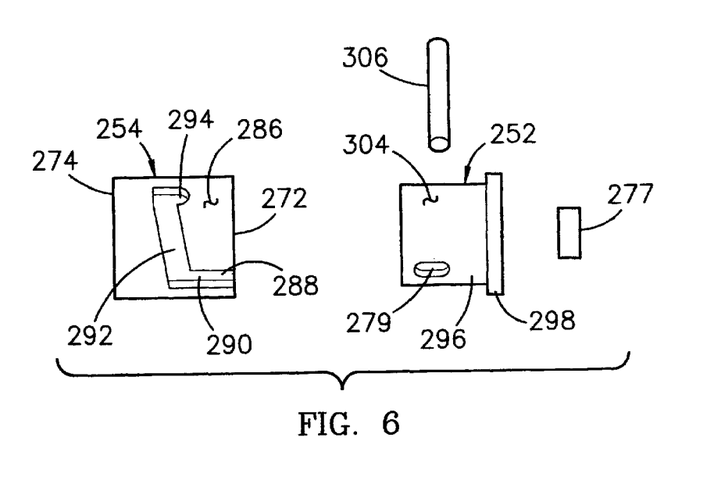
FIG. 6 is a side assembly view of the quick-connect fastener, particularly illustrating the decoupled male member, female member, and biasing mechanism.

Referring now to FIG. 5, male member 252 includes a generally cylindrical protrusion 296, a flange 298, an axially extending bore 266, and a pair of coupling elements 302. Protrusion 296 presents a generally cylindrical and substantially smooth (i.e., unthreaded) outer surface 304 having a diameter which is marginally less than the diameter of internal bore 275 of female member 254, thereby allowing protrusion 296 to be translated into and rotated within internal bore 275 of female member 254 while restricting relative lateral shifting of male member 252 and female member 254. Coupling elements 302 extend generally radially outward from outer surface 304 of protrusion 296. Preferably, coupling elements 302 are formed of a single rod 306 extending through protrusion 296. A biasing mechanism 277 (best shown in FIGS. 5, 6, and 7) is positioned in an axial bore 266 of male member 252 generally between rod 306 and an end wall 281 of male member 252. Protrusion 296 defines a pair of generally axially extending slots 279 within which rod 306 is received and through which rod 306 extends. Rod 306 is shiftable within slots 279 between an extended position (wherein rod 306 is positioned in slot 279 towards flange 298) and a retracted position (wherein rod 306 is positioned in slot 262 towards end wall 281). Biasing mechanism 277 contacts both end wall 281 and rod 306 and is operable to bias rod 306 (and coupling elements 302) towards the extended position. Biasing mechanism 277 can be any structure, such as a helical spring, capable of biasing rod 306 towards the extended position. Preferably, biasing mechanism 276 is formed of a unitary piece of a resilient material such as neoprene (i.e., a "neoprene spring"). Coupling elements 302 are adapted to be slidably received within slots 288 of female member 254 when male and female members 252, 254 are coupled together. Axial bore 266 (best shown in FIG. 7) includes a female threaded opening 283 proximate flange 298.

Referring now to FIGS. 3–7, in operation, once male member 252 is coupled to threaded nipple 221 and female member 254 is coupled to threaded nipple 232, electrical supply wires 210 of sconce 200 can be electrically coupled to electrical source wires 236 of J-box 228. Once sconce 200 is electrically wired to source wires 236, sconce 200 can then be physically coupled to J-box 228 by simply inserting protrusion 296 of male member 252 into internal bore 275 of female member 254 so that coupling elements 302 slide within generally axially extending portions 290 of slots 288. Sconce 200 can then be rotated relative to J-box 228, causing coupling elements to travel through generally circumferentially extending portions 292 of slots 288 and come to rest in terminal recess 294 of slots 288. While male member 252 is being rotated relative to female member 254, biasing mechanism 277 is being compressed between rod 306 and end wall 281 of male member 252. Thus, the axial force exerted by biasing mechanism on rod 306 causes coupling elements 302 to "snap" into terminal recesses 294 and thereby restrains rotation of sconce 200 relative to J-box 208 when coupling elements 302 are received in terminal recesses 294. Slots 288 are preferably configured so that sconce 200 rotates through an angle of less than 360° when coupling elements 302 travel from generally axially extending portions 290 of slots 288 to terminal recesses 294 through generally circumferentially extending portions 292. Such a minimum angle of rotation ensures that excessive twisting of electrical wires 210,236 does not occur during the rotation of sconce 200 relative to J-box 228 required when sconce 200 is coupled to J-box 228 via quick-connect fastener 250. Preferably, such minimum angle of rotation during coupling of sconce 200 to J-box 228 is less than 180°, most preferably less than 90°.

Referring to FIG. 3, in order to ensure that back plate 206 of sconce 200 is received flushly against the surface of the wall on which J-box 228 is mounted, it may be necessary to adjust the distance between back strap 230 and female member 254 by loosening nut 248, screwing or unscrewing nipple 232 in back strap 230, and retightening nut 248. It may also be necessary to adjust the distance between hickey 208 and male member 252 by loosening nut 225, screwing or unscrewing nipple 221 in second end 223 of hickey 208, and retightening nut 225. Similarly, in order to ensure that sconce 200 is properly aligned so that end piece 204 extends substantially vertically (rather than tilted to one side or the other) when sconce 200 is mounted on J-box 228, the rotational position of female member 254 on threaded nipple 232 can be adjusted by adjusting nipple 232 and hex nut 248 relative to back plate 206. Alternatively, proper vertical alignment of sconce 200 can be ensured through the adjustment of the rotational position of male member 252 relative to hickey 208 by adjusting nipple 221 and hex nut 225 relative to second end 223 of hickey 208.

Although the invention has been described with reference to the preferred embodiment illustrated in the attached drawing figures, it is noted that equivalents may be employed and substitutions made herein without departing from the scope of the invention as recited in the claims. For example, the locations of male member 252 and female member 254 can be switched so that male member 252 is coupled to backstrap 230 and female member 254 is coupled to hickey 208.

Having thus described the preferred embodiment of the invention, what is claimed as new and desired to be protected by Letters Patent includes the following:

1. A connector for releasably coupling an electrical fixture to a J-box, said connector comprising:

a female member having an inner surface which defines an internal bore, said female member including at least one connection slot extending into the inner surface, said slot comprising a generally circumferentially extending portion and a generally axially extending terminal recess, said generally circumferentially extending portion extending in a direction which is skewed from perpendicular to the longitudinal axis of the internal bore;

a male member presenting an outer surface which defines a protrusion, said male member including at least one coupling element extending outwardly from the outer surface, said coupling element being shiftable relative to the protrusion, said male member defining an internal bore and a biasing mechanism disposed in said internal bore; and said male and female members being shiftable between a decoupled position wherein the male and female members are separated from one another and a coupled position wherein the protrusion is at least partly received in the internal bore and the coupling element is at least partly received in the terminal recess, thereby inhibiting rotation of the male and female members relative to one another.

2. The connector according to claim 1, said biasing mechanism configure holding the coupling element in the terminal recess when the male and female members are in the coupled position.

3. The connector according to claim 2, said protrusion defining a generally axially extending coupling element slot within which the coupling element is received, said coupling element being axially shiftable relative to the protrusion in the coupling element slot between a retracted position and an extended position, said coupling element being in the extended position when the male and female members are in the coupled position, said biasing mechanism being operable to bias the coupling element towards the extended position.

4. The connector according to claim 3, said male member including a radially extending flange proximate one end of the protrusion, said coupling element being closer to the flange when the coupling element is in the extended position than when the coupling element is in the retracted position.

5. The connector according to claim 4, said male member including an end wall proximate another end of the protrusion which is generally opposite said one end of the protrusion, said biasing mechanism being positioned generally between the end wall and the coupling element.

6. The connector according to claim 5, said biasing mechanism being a spring.

7. The connector according to claim 6, said biasing mechanism comprising a neoprene material.

8. The connector according to claim 2, said female member comprising a generally annular cylindrical side wall which defines the inner surface, said connection slot extending completely through the side wall.

9. The connector according to claim 8, said female member including an open end and a closed end, said internal bore extending axially inward from the open end, said connection slot being open at the open end.

10. The connector according to claim 9, said connection slot further comprising a generally axially extending portion, said generally circumferentially extending portion extending between the terminal recess and the generally axially extending portion, said generally axially extending portion of the connection slot being positioned adjacent the open end.

11. The connector according to claim 10, said female member including two of the connection slots circumferentially spaced around the internal bore, said male member including two of the coupling elements circumferentially spaced around the protrusion, each of said coupling elements being received in a respective one of the connection slots when the male and female members are in the coupled position.

12. The connector according to claim 11, said coupling element being formed of a common rod which extends radially through the male member.

13. The connector according to claim 12, said male and female members each including an axially extending threaded opening adapted to threadably receive a respective male threaded nipple.

14. An electrical fixture mountable adjacent a generally flat surface via a standard J-box, said fixture comprising:

an arm assembly adapted to extend outwardly from the surface when the fixture is mounted adjacent the surface; and a quick-connect fastener adapted to releasably couple the arm assembly to the J-box, said fastener comprising:

a female member having an inner surface which defines an internal bore, said female member including a connection slot extending into the inner surface, said connection slot including a generally circumferentially extending portion and a generally axially extending terminal recess, said generally circumferentially extending portion extending in a direction which is skewed from perpendicular to the longitudinal axis of the internal bore, a male member presenting an outer surface which defines a protrusion, said male member including a coupling element extending outwardly from the outer surface, said coupling element being shiftable relative to the protrusion, said male member defining an internal bore, and a biasing mechanism disposed in said internal bore, one of said members being coupled to the arm assembly, the other of said members being adapted to be coupled to the J-box, said quick-connect fastener being shiftable between a decoupled position wherein the male and female members are separated and a coupled position wherein the protrusion is at least partly received in the internal bore and the coupling element is held in the terminal recess by the biasing mechanism, thereby inhibiting rotation of the male and female members relative to one another.

15. The electrical fixture according to claim 14, said biasing mechanism being a spring.

16. The electrical fixture according to claim 15, said biasing mechanism comprising a neoprene material.

17. The electrical fixture according to claim 14, said connection slot further including a generally axially extending portion, said circumferentially extending portion extending between the axially extending portion and the terminal recess.

18. The electrical fixture according to claim 17, said female member comprising a generally annular cylindrical side wall which defines the inner surface, said connection slot extending completely through the side wall.

19. The electrical fixture according to claim 18, said female member including an axially extending threaded opening adapted to threadably receive a male threaded nipple.

20. A sconce mountable on a wall via a conventional J-box, said sconce comprising:

a light bulb socket adapted to receive a light bulb;

an elongated arm having a distal end coupled to the socket and a proximal end, said arm defining an internal channel extending between the proximal and distal ends;

an electrically conductive wire electrically coupled to the light bulb socket, extending through the internal channel, and projecting out of the proximal end of the arm;

a back strap adapted to be coupled to the J-box; and a quick-connect fastener comprising:

a female member coupled to the back strap and having an inner surface which defines an internal bore, said female member including a connection slot extending into the inner surface, said slot comprising a generally axially extending portion, a generally circumferentially extending portion, and a generally axially extending terminal recess, said generally circumferentially extending portion extending in a direction which is skewed from perpendicular to the longitudinal axis of the internal bore, a male member coupled to the proximal end of the arm and presenting an outer surface which defines a protrusion, said male member including a coupling element extending outwardly from the outer surface, said coupling element being shiftable relative to the protrusion, and a biasing mechanism, said quick-connect fastener being shiftable between a decoupled position wherein the male and female members are separated and a coupled position wherein the protrusion is at least partly received in the internal bore and the coupling element is held in the terminal recess by the biasing mechanism, thereby inhibiting rotation of the male and female members relative to one another.

21. The sconce according to claim 20, said female member comprising a generally annular cylindrical side wall which defines the inner surface, said connection slot extending completely through the side wall.

22. The sconce according to claim 21, said female member including two of the connection slots circumferentially spaced around the internal bore, said male member including two of the coupling elements circumferentially spaced around the protrusion, each of said coupling elements being received in a respective one of the connection slots when the fastener is in the coupled position.

23. The sconce according to claim 20, said female member including an open end and a closed end, said internal bore extending axially inward from the open end, said connection slot being open at the open end.

24. The sconce according to claim 23, said generally axially extending portion of the connection slot being positioned adjacent the open end, said generally circumferentially extending portion of the connection slot being spaced from both the open and closed ends.

25. The sconce according to claim 24, said circumferentially extending portion of the connection slot extending between the terminal recess and the axially extending portion.

26. The sconce according to claim 25, said protrusion defining a generally axially extending coupling element slot within which the coupling element is received, said coupling element being axially shiftable relative to the protrusion in the coupling element slot between a retracted position and an extended position, said coupling element being in the extended position when the male and female members are in the coupled position, said biasing mechanism being operable to bias the coupling element towards the extended position.

27. A method of mounting an electrical fixture adjacent a surface via a standard J-box, said method comprising the steps of:

(a) coupling one of either a male member or a female member to a back strap;
(b) coupling the other of the male or female members to the fixture;
(c) inserting a protrusion of the male member into an internal bore of the female member; and
(d) rotating the fixture relative to the J-box through an angle of less than 360°, thereby securely coupling the fixture to the J-box, said rotating being performed without substantial axial shifting of the protrusion relative to the female member, said rotating causing a protruding coupling element of the male member to shift relative to the protrusion.

28. The method according to claim 27; and
(e) prior to step (c), coupling the back strap to the J-box.

29. The method according to claim 28; and
(f) prior to step (c), electrically coupling electrical supply wires of the fixture to electrical source wires extending from the J-box.

30. A method according to claim 27, said male member including a pair of said protruding coupling elements, said internal bore including a pair of connection slots, said coupling elements being received in said connection slots during step (d).

31. The method according to claim 30, each of said connection slots including a generally axially extending terminal recess.

32. The method according to claim 31, step (d) including the step of inserting the coupling element into the terminal recess, thereby inhibiting rotation of the male member relative to the female member.

33. The method according to claim 30, each of said connection slots including a generally circumferentially extending portion extending in a direction skewed from perpendicular to the longitudinal axis of the internal bore.

34. The method according to claim 33, said generally circumferentially extending portion causing the protruding coupling element to shift relative to the protrusion during said rotating of step (d).

35. The method according to claim 27; and step (c) including positioning the electrical fixture into contact with the surface, said electrical fixture being maintained in contact with the surface throughout said rotating of step (d).

36. The method according to claim 35, said electrical fixture being a wall sconce, said surface being a vertical wall, step (c) including causing a backplate of the sconce to engage the wall.

* * * * *